(12) United States Patent
Ohnishi

(10) Patent No.: US 7,591,586 B2
(45) Date of Patent: Sep. 22, 2009

(54) METHOD OF TEMPERATURE MEASUREMENT AND TEMPERATURE-MEASURING DEVICE USING THE SAME

(75) Inventor: Akira Ohnishi, Kanagawa (JP)

(73) Assignee: Japan Aerospace Exploration Agency, Tokyo (JP)

( * ) Notice: Subject to any disclaimer, the term of this patent is extended or adjusted under 35 U.S.C. 154(b) by 5 days.

(21) Appl. No.: 11/836,693

(22) Filed: Aug. 9, 2007

(65) Prior Publication Data

US 2008/0037610 A1 Feb. 14, 2008

(30) Foreign Application Priority Data

Aug. 11, 2006 (JP) ............................. 2006-219895

(51) Int. Cl.
*G01J 5/00* (2006.01)
(52) U.S. Cl. ...................... 374/129; 374/121; 374/130; 374/126; 374/2
(58) Field of Classification Search ................. 374/129, 374/121, 130, 126, 2
See application file for complete search history.

(56) References Cited

U.S. PATENT DOCUMENTS 5,203,631 A * 4/1993 Delfino et al. .............. 374/123

5,822,222 A * 10/1998 Kaplinsky et al. ........... 702/134

OTHER PUBLICATIONS

Manara, Jochen, et al. "Emittance of $Y_2O_3$ stabilised $ZrO_2$ thermal barrier coatings prepared by electron-beam physical-vapour deposition," High Temperatures-High Pressures, 2000, vol. 32, pp. 361-368; 15 ECTP Proceedings, pp. 347-354.
Yajima, D., et al. "Simultaneous Measurement Method of Normal Spectral Emissivity and Optical Constants at High Temperatures," $15^{th}$ Symposium on Thermophysical Properties, Jun. 22-27, 2003, Boulder, Colorado.

(Continued)

*Primary Examiner*—Gail Verbitsky
*Assistant Examiner*—Mirellys Jagan
(74) *Attorney, Agent, or Firm*—Blakely, Sokoloff, Taylor & Zafman LLP

(57) ABSTRACT

A method of precisely measuring temperature of an object without having to setting the emissivity of the object over a wide temperature range from low to high temperature with a single radiation thermometer. The temperature-measuring device of the present invention includes a reference object having an emissivity of substantially 1 in a prescribed wavelength range; a bandpass filter transmitting radiant energy in the prescribed wavelength range; and a radiation thermometer for observing temperature by taking in the radiant energy transmitted through the bandpass filter. The device has a structure for measuring temperature of an object by bringing the reference object into contact with the object, observing temperature radiated from the reference object after the temperature of the reference object has become substantially in the thermal equilibrium with the object and transmitted through the bandpass filter using the radiation thermometer, and determining the object temperature based on the observed temperature.

6 Claims, 2 Drawing Sheets

OTHER PUBLICATIONS

B. Rousseau, et al., "Temperature Measurement: Christiansen Wavelength and Blackbody Reference," XPO19279325, International Journal of Thermophysics, Journal of Thermophysical Properties and Therophysics and Its Applications, vol. 26, No. 4, pp. 1277-1286 (Jul. 1, 2005).

D. Yajlma, et al., "Simultaneous Measurement Method for Normal Spectral Emissivity and Optical Constants at High Temperatures," XP002516497, Fifteenth Symposium on Thermophysical Properties, 11 pgs. (2003).

O. Rozenbaum, et al., "A sprectroscopic method to measure the spectral emissivity of semitransparent materials up to high temperature," XP012037139, Review of Scientific Instruments, vol. 70, No, 10, pp. 4020-4025 (Oct. 1, 1999).

European Search Report for EP Counterpart Patent Application No. 07113365, 7 pgs. (Mar. 6, 2009).

* cited by examiner

METHOD OF TEMPERATURE MEASUREMENT AND TEMPERATURE-MEASURING DEVICE USING THE SAME

CROSS-REFERENCE TO RELATED APPLICATIONS

The present patent application claims priority from Japanese Patent Application No. 2006-219895, filed on Aug. 11, 2006.

BACKGROUND OF THE INVENTION

1. Field of the Invention

The present invention relates to a method which can precisely measure temperature of an object in a noncontacting manner using a radiation thermometer over a wide temperature range from low to high temperature without having to setting the emissivity of the object. The present invention also relates to a temperature-measuring device implementing the method.

2. Description of the Related Art

In order to measure the true temperature of an object surface in a noncontacting manner, it is important that the emissivity of the object, which is one of thermal properties, and its temperature dependency are exactly determined. The measurement accuracy of a noncontact radiation thermometer highly depends on whether the emissivity is correctly set or not.

Known radiation thermometers are provided with emissivity setting dial for setting emissivity of an object to be measured. The emissivity is determined by adjusting this dial, and the temperature is measured based on this emissivity. However, the temperature of an object is not always measured in consideration of exact temperature dependency of the emissivity of the object. Therefore, in some cases, the emissivity is separately determined before the measurement of temperature. In such cases, the advantage of radiation thermometers, i.e., simple measurement in a noncontacting manner, is attenuated.

In two-color radiation thermometers, the setting of emissivity is not required in the measurement of an object of a greybody surface. However, the setting of emissivity is necessary in the measurement of surface temperature of objects other than greybodies. In addition, in known radiation thermometers, temperatures over a wide range from a low- (about −50 to 0° C.) and a middle-temperature (from about room temperature to 600° C.) to a high-temperature (600 to 3000° C.), cannot be measured by a single thermometer, because of the restriction caused by the characteristics and sensitivities of a temperature sensor. Consequently, a plurality of radiation thermometers is necessary for measuring temperatures over a wide range.

SUMMARY OF THE INVENTION

Accordingly, it is an object of the present invention to provide a method of precisely measuring temperature of an object without having to setting the emissivity of the object over a wide temperature range from low to high temperature by a single thermometer. Further, it is an object of the present invention to provide a temperature-measuring device implementing the method.

The temperature-measuring device according to the present invention includes a reference object having an emissivity which can be assumed to be substantially 1 and not to depend on temperature in a prescribed wavelength range (refractive index: 1, extinction coefficient: 0); a bandpass filter transmitting radiant energy in the prescribed wavelength range; and a radiation thermometer for observing temperature by taking in the radiant energy transmitted through the bandpass filter. The temperature-measuring device has a structure for measuring temperature of an object by bringing the reference object into contact with the object, observing temperature radiated from the reference object after the temperature of the reference object has become substantially in the thermal equilibrium with the object and transmitted through the bandpass filter with the radiation thermometer, and determining the object temperature based on the observed temperature.

The temperature-measuring device may have a light-attenuating filter for transmitting the radiant energy after being transmitted through the bandpass filter. With this, the measurement of temperature in a high temperature range can be also carried out using the same radiation thermometer used for the measurement in a low temperature range.

Any reference object having an emissivity which is substantially 1 and does not depend on temperature over a prescribed wavelength range can be used. Examples of such a reference object include $ZrO_2$, $Al_2O_3$, and $Si_3N_4$.

In the temperature measurement using the above-mentioned temperature-measuring device, the reference object is brought into contact with an object so as to be substantially in the thermal equilibrium with the object. Then, the radiant energy radiated from the reference object which is substantially in the thermal equilibrium with the object is transmitted through the bandpass filter. The radiant energy transmitted through the bandpass filter is observed by the radiation thermometer to determine temperature. Temperature in a high temperature range can be also determined by using the light-attenuating filter. Therefore, a plurality of devices is not necessary.

Since the reference object can be assumed to have an emissivity of 1, the emissivity adjustment is not necessary by measuring temperature using the above-described device according to the above-described method, unlike known radiation thermometer. Consequently, a measurement error caused by adjusting the emissivity can be avoided, resulting in precise temperature measurement. Furthermore, the use of a light-attenuating filter enables to measure temperature over a wide temperature range by a single device.

DESCRIPTION OF THE PREFERRED EMBODIMENTS

An embodiment of the present invention will now be described with reference to the drawings.

Basically, the device for measuring temperature according to the method of the present invention includes a material which constantly has an emissivity of 1 at a certain wavelength (Christiansen wavelength) in a temperature range from low to high temperature; a bandpass filter transmitting only radiation at the Christiansen wavelength; a radiation thermometer; and a light-attenuating filter which is used according to need.

Figure 1:
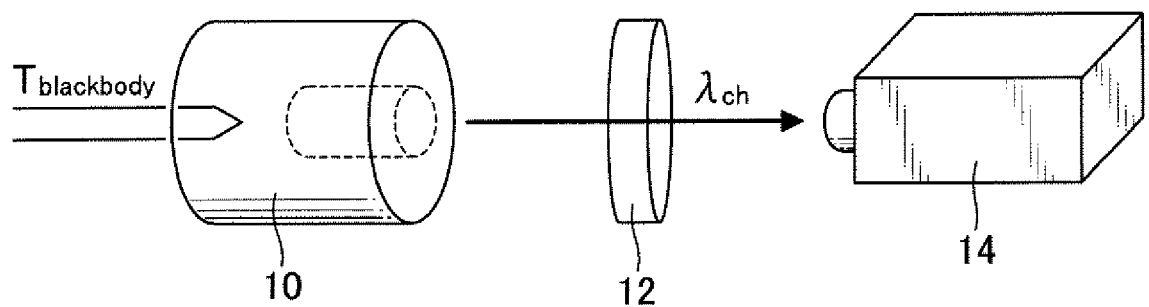
FIG. 1 shows a method for correcting the radiation thermometer used for performing the method according to an embodiment of the present invention.
Figure 2:
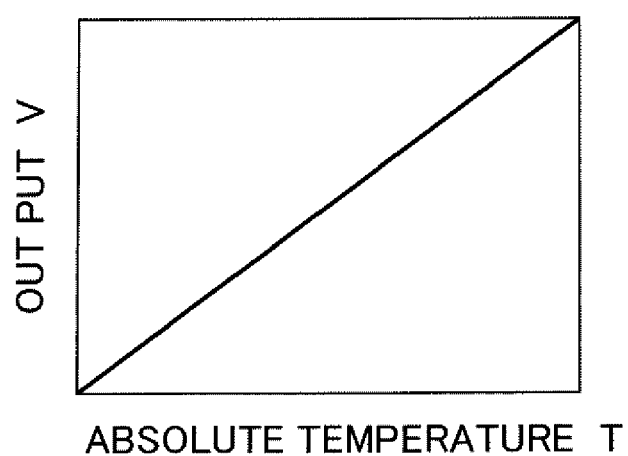
FIG. 2 is a characteristic graph showing the relationship between output V of a radiation thermometer and absolute temperature T.

FIG. 1 shows a method for correcting the radiation thermometer used for performing the method described above. In FIG. 1, reference numeral 10 denotes a blackbody, and $T_{blackbody}$ denotes the absolute temperature. The bandpass filter 12 selectively transmits a radiation wavelength $\lambda_{ch}$ at which the reference object exhibiting the Christiansen effect described below has an emissivity of 1. The radiation thermometer 14 is of determining blackbody temperature by observing the radiant energy transmitted through the bandpass filter 12. FIG. 2 is a characteristic graph showing the relationship between output V of the radiation thermometer 14 and absolute temperature T. As shown in FIG. 2, the output V of the radiation thermometer 14 is proportional to the absolute temperature T. Therefore, the radiation thermometer 14 can be corrected based on the temperature $T_{blackbody}$ of the blackbody. Here, it should be noted that there is no relationship between the correction of the radiation thermometer and the adjustment of emissivity.

Figure 3:
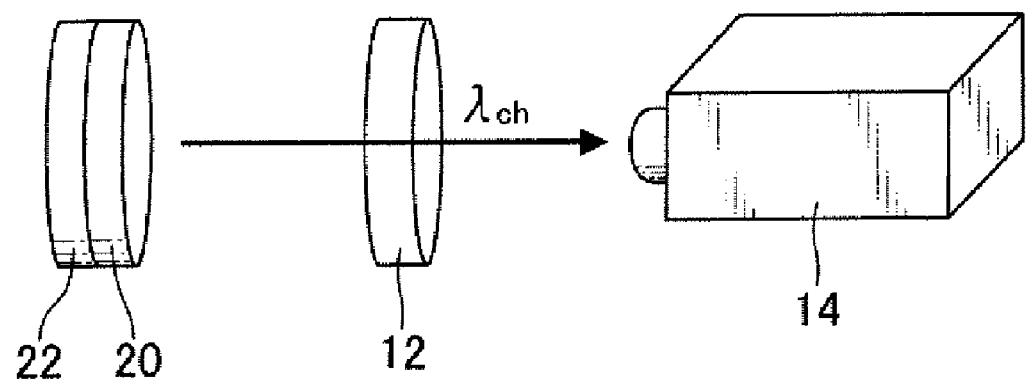
FIG. 3 is a diagram illustrating the measurement of temperature by the method according to an embodiment of the present invention.

The temperature is measured using the thus corrected radiation thermometer 14 as shown in FIG. 3. That is, first, a reference object 20 exhibiting the Christiansen effect at a certain wavelength region (i.e., having an emissivity of 1 in the certain wavelength region) is brought into contact with an object 22 for generating a thermal equilibrium between the both. After the generation of the thermal equilibrium, the radiant energy passing through the bandpass filter 12 is observed by the radiation thermometer 14 to determine temperature. Thus, the exact temperature can be obtained regardless of the emissivity.

Figure 4:
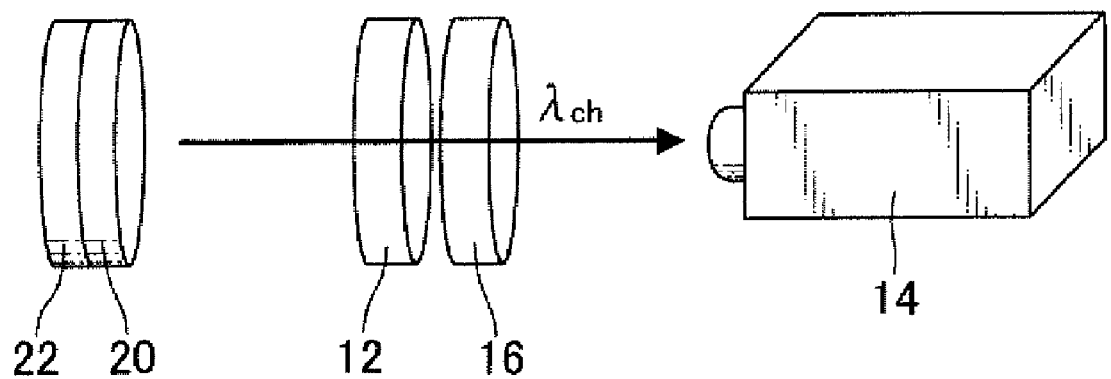
FIG. 4 is a diagram illustrating the measurement of temperature by the method according to an embodiment of the present invention.

Furthermore, when the temperature of the object 22 is very high, as shown in FIG. 4, the radiation transmitted through a light-attenuating filter 16 disposed in back of the bandpass filter 12 is measured by the radiation thermometer 14. With this, the temperature measurement in a high temperature range can be performed. As a result, the temperature measurement over a wide temperature range from low to high temperature can be performed using a single radiation thermometer 14.

According to the method and the device of this embodiment, the setting of emissivity of an object, which is necessary in known radiation thermometers, is not necessary. Thereby, an electric circuit for emissivity correction is unnecessary to achieve both high reliability and a low cost. Furthermore, in known methods for measuring radiation temperature, a plurality of devices are necessary for measuring temperature over a wide range from low temperature (about −100° C.) to high temperature (about 3000° C.). However, in the method according to the present invention, by using a combination of a bandpass filter and a light-attenuating filter, temperature over such a wide temperature range can be measured using a single radiation thermometer. In addition, the object is not limited to a solid and may be a liquid. Furthermore, the measurement environment is not limited to the atmosphere and may be a vacuum.

The method and the device according to the present invention are effective not only in aerospace but also in fields which require high temperature such as blast furnaces and temperature dissociation such as semiconductors. Furthermore, the method and the device according to the present invention can be applied to manufacturing and research in various fields which require precise measurement of temperature in a non-contacting manner.

What is claimed:

1. A method of measuring temperature, the method comprising:
   bringing a reference object having an emissivity which is substantially 1 and does not depend on temperature in a prescribed wavelength range into contact with an object so as to be substantially in the thermal equilibrium with the object;
   transmitting the radiant energy radiated from the reference object substantially in the thermal equilibrium with the object and in the prescribed wavelength range through a bandpass filter; and
   observing the radiant energy transmitted through the bandpass filter with a radiation thermometer and determining temperature of the reference object.

2. The method of measuring temperature according to claim 1, the method further comprising:
   transmitting the radiant energy transmitted through the bandpass filter through a light-attenuating filter.

3. The method of measuring temperature according to claim 1, wherein the reference object is selected from the group consisting of $ZrO_2$, $Al_2O_3$, and $Si_3N_4$.

4. A temperature-measuring device, comprising:
   a reference object having an emissivity of substantially 1 not depending on temperature in a prescribed wavelength range;
   a bandpass filter transmitting radiant energy in the prescribed wavelength range; and
   a radiation thermometer for measuring temperature by taking in the radiant energy transmitted through the bandpass filter, and
   the device having a structure for measuring temperature of an object by bringing the reference object into contact with the object, observing temperature radiated from the reference object after the temperature of the reference object has become substantially in the thermal equilibrium with the object and transmitted through the bandpass filter with the radiation thermometer, and determining the object temperature based on the observed temperature.

5. The temperature-measuring device according to claim 4, the device further comprising a light-attenuating filter transmitting the radiant energy transmitted through the bandpass filter.

6. The temperature-measuring device according to claim 4, wherein the reference object is selected from the group consisting of $ZrO_2$, $Al_2O_3$, and $Si_3N_4$.

* * * * *